T. D. GLEESON.
CONNECTION FOR PIPES.
APPLICATION FILED JUNE 12, 1908.
937,065.
Patented Oct. 19, 1909.
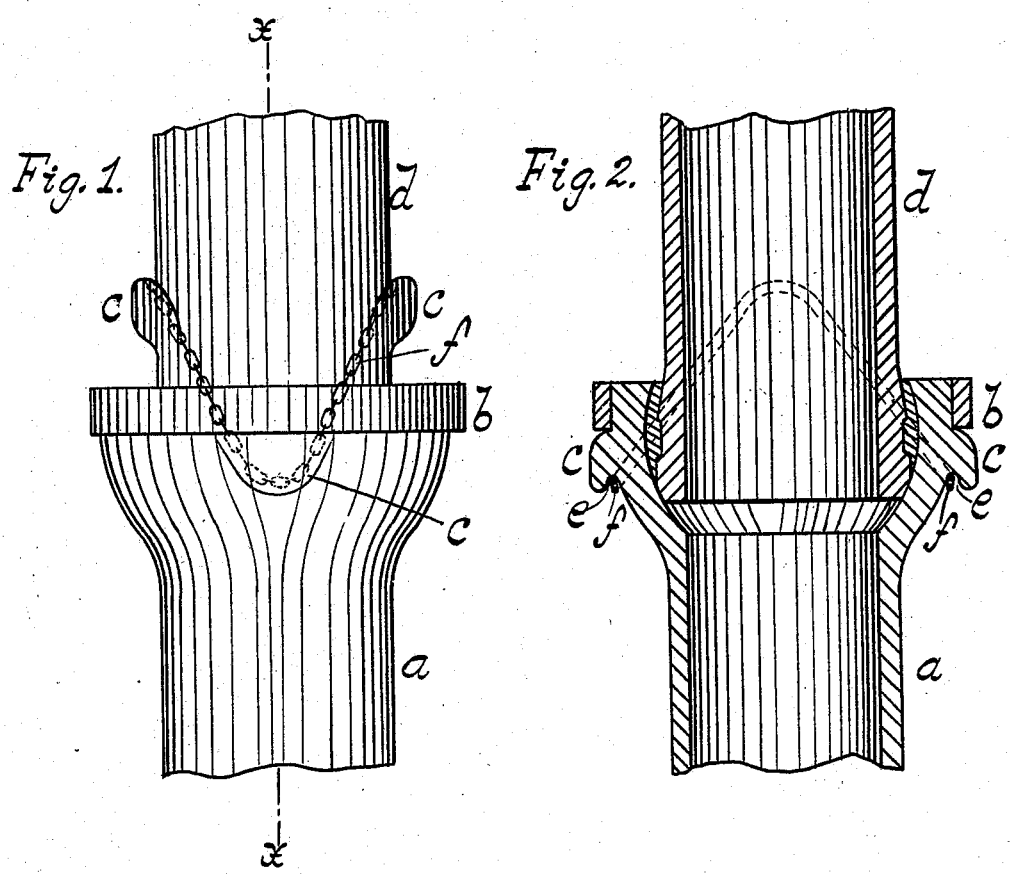
WITNESSES:
Edward Wiesner
Christian Almstaedt
INVENTOR
Timothy D. Gleeson
BY W. C. Hauff
ATTORNEY

UNITED STATES PATENT OFFICE.

TIMOTHY D. GLEESON, OF NEW YORK, N. Y.

CONNECTION FOR PIPES.

937,065.     Specification of Letters Patent.     Patented Oct. 19, 1909.

Application filed June 12, 1908. Serial No. 438,141.

*To all whom it may concern:*

Be it known that I, TIMOTHY D. GLEESON, a citizen of the United States, residing at New York city, in the county of New York and State of New York, have invented new and useful Improvements in Connections for Pipes, of which the following is a specification.

This invention relates to a flexible joint or connection for pipes which connection allows of lateral movement of the pipes but will prevent their being pulled apart or separated.

This invention is to be applied chiefly to pipes or conduits which are sunk in a river but it can also be applied to conduits not in water.

With conduits or pipes simply connected by lead or the like and laid or sunk in a river it frequently occurs that the tide of the river will cause the pipes to be moved, which movement will loosen the lead and cause the pipes to be separated or are forced apart causing them to leak.

This invention is designed to overcome such defect. According to this invention the pipes are connected in the usual way and have lugs around which lugs are passed an endless chain or flexible connection. Thus the pipes can move laterally but the chain prevents the pipes from separating or being forced apart.

This invention is set forth in the following specification and claims and illustrated in the annexed drawing, in which:

Figure 1 is a face view of a pipe connection embodying this invention and Fig. 2 is a section along line $x\ x$ Fig. 1.

In the above drawing the letter $a$ shows a pipe on which is secured an iron band $b$ which however is no part of this invention. At $c$ are shown lugs adjacent to each other on the pipes $a$ and $d$. These lugs $c$ are integral with the respective pipes and are formed with the latter when cast or molded. These lugs $c$ are hook shaped as shown at $e$ (Fig. 2). An endless chain is shown at $f$ which engages the hook shaped lugs $c$. Instead of a chain I could also use a cable or wire rope or iron band. This chain or connecting means will prevent the pipes $a$ and $d$ from becoming separated while at the same time it will allow lateral movement of the pipes.

As shown in Fig. 1 when the pipe $d$ is moved either to right or left the chain $f$ slips or moves over the lugs $c$ in the pipe $a$. When the pipe $d$ (Fig. 2) is moved to right or left the chain moves over the lugs on the pipe $d$. Thus it is readily understood that the pipes can move laterally.

Heretofore when the pipes were moved laterally a few times they became separated. This cannot happen with a connection of this invention inasmuch as chain $f$ being wound or placed around the lugs $c$ will prevent the pipes becoming separated.

The lugs $c$ are adjacent to each other and when the pipes are secured together they should set so that the lugs on pipe $a$ face in the opposite direction to the lugs on pipe $d$.

Instead of chain $f$ an iron band made in four pieces so shaped as to fit the curves of the pipe sections and connected by means of bolts can be used to hold the pipe sections together.

Now what I claim is:

1. In a connection, two pipes, adjacent lugs on each pipe and a flexible connection adapted to engage the lugs on each pipe to prevent separation of the pipes said lugs being arranged out of line and alternating with each other on the respective pipes so as to cause the flexible connection to assume serpentine form and allow lateral movement of the same said lugs being rounded to allow slipping of the connection.

2. In a connection, two pipes, adjacent hook shaped lugs on each pipe and an endless chain engaging the hook shaped lugs on each pipe said lugs being rounded and convexed to allow slipping of the chain.

3. In a connection, two pipes, adjacent hook shaped lugs on each pipe, and endless connecting means engaging the hook shaped lugs to hold the pipes together and prevent separation of the same, the said lugs being integral with the respective pipes said lugs being smooth and rounded to allow slipping of the chain.

In testimony whereof I have hereunto set my hand in the presence of two subscribing witnesses.

TIMOTHY D. GLEESON.

Witnesses:
CHRISTIAN ALMSTAEDT,
EDWARD CHIESUER.